July 25, 1967 J. S. PAGE, JR 3,332,497
TUBING AND ANNULUS PRESSURE RESPONSIVE
AND RETRIEVABLE VALVE
Filed Nov. 12, 1964 8 Sheets-Sheet 1
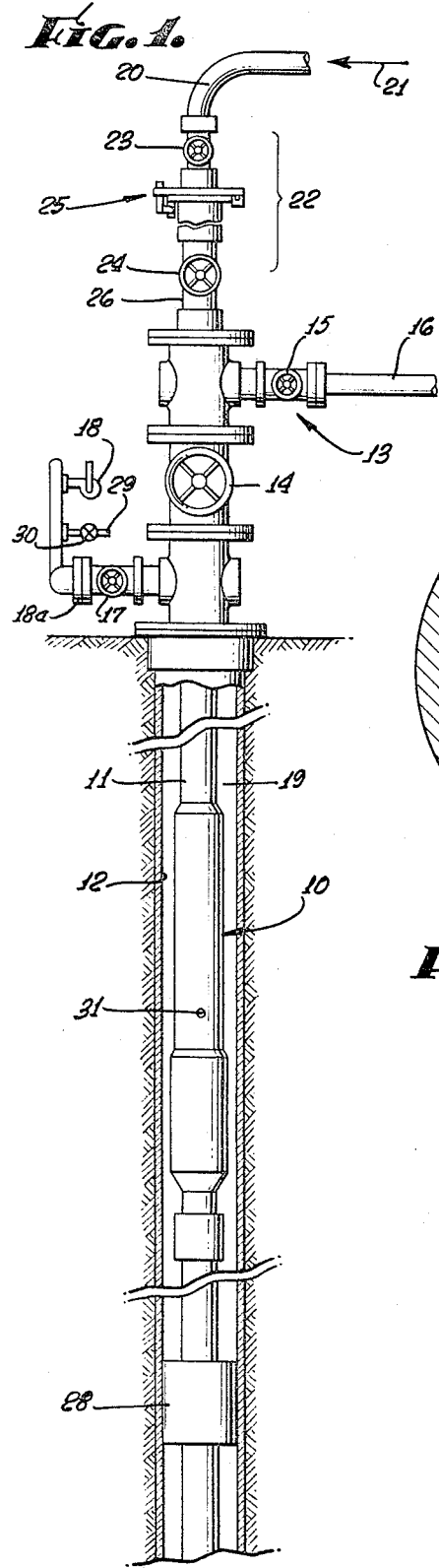
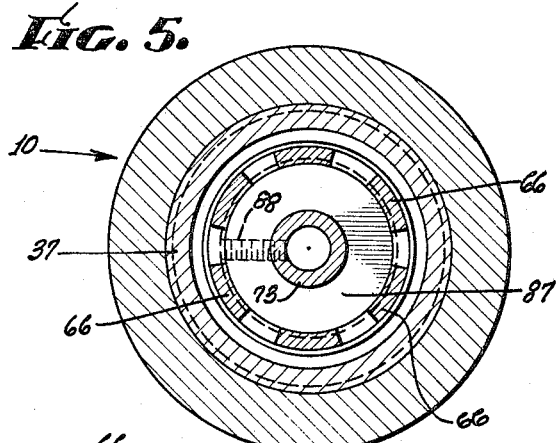
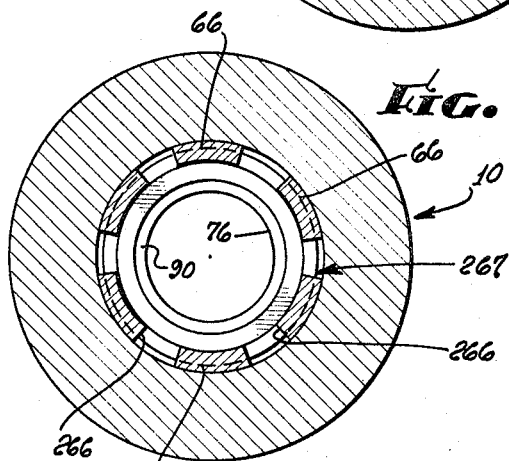
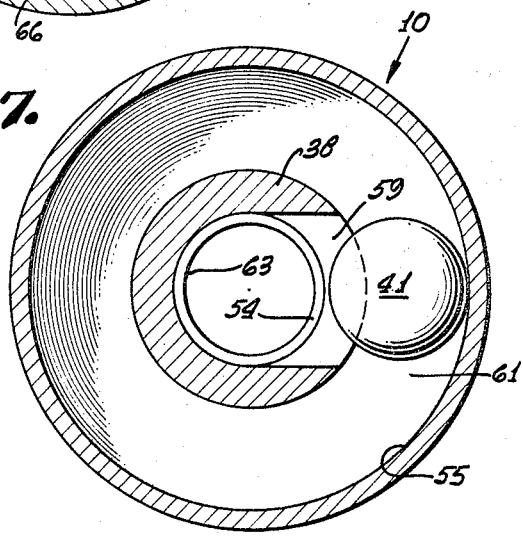
INVENTOR.
JOHN S. PAGE, JR.
BY White & Haefliger
ATTORNEYS.

July 25, 1967

J. S. PAGE, JR 3,332,497

TUBING AND ANNULUS PRESSURE RESPONSIVE
AND RETRIEVABLE VALVE

Filed Nov. 12, 1964

INVENTOR.
JOHN S. PAGE, JR.
BY White & Haefliger
ATTORNEYS.

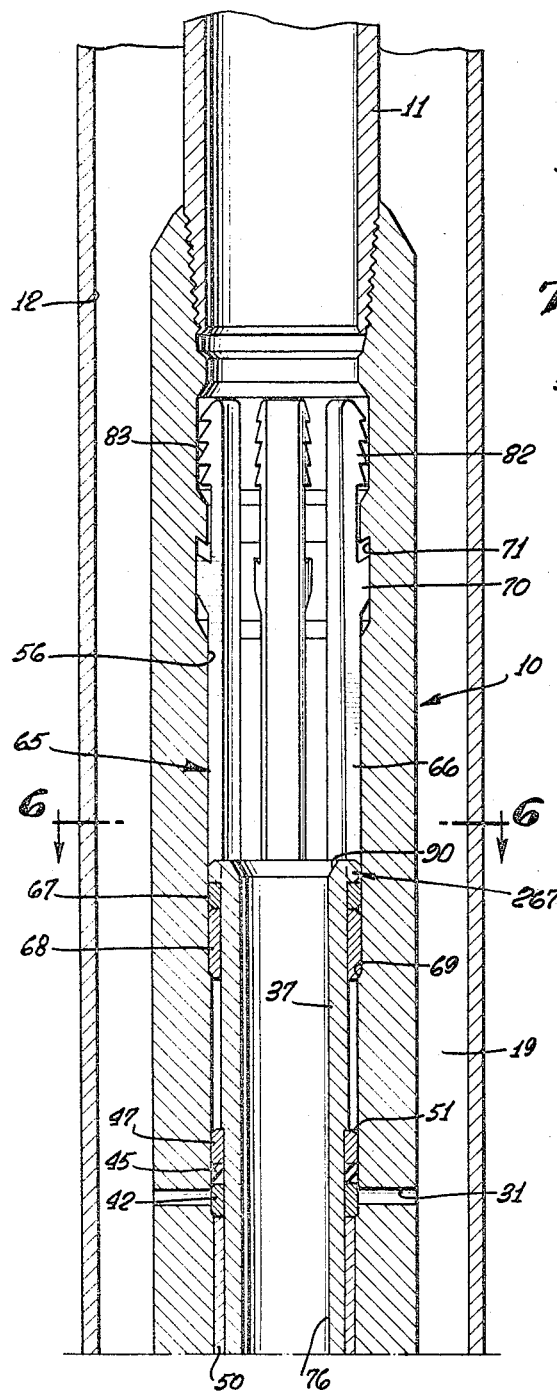

July 25, 1967 J. S. PAGE, JR 3,332,497
TUBING AND ANNULUS PRESSURE RESPONSIVE
AND RETRIEVABLE VALVE
Filed Nov. 12, 1964 8 Sheets-Sheet 4

INVENTOR.
JOHN S. PAGE, JR.
BY *White & Haefliger*
ATTORNEYS.

July 25, 1967
J. S. PAGE, JR
3,332,497
TUBING AND ANNULUS PRESSURE RESPONSIVE
AND RETRIEVABLE VALVE
Filed Nov. 12, 1964
8 Sheets-Sheet 5
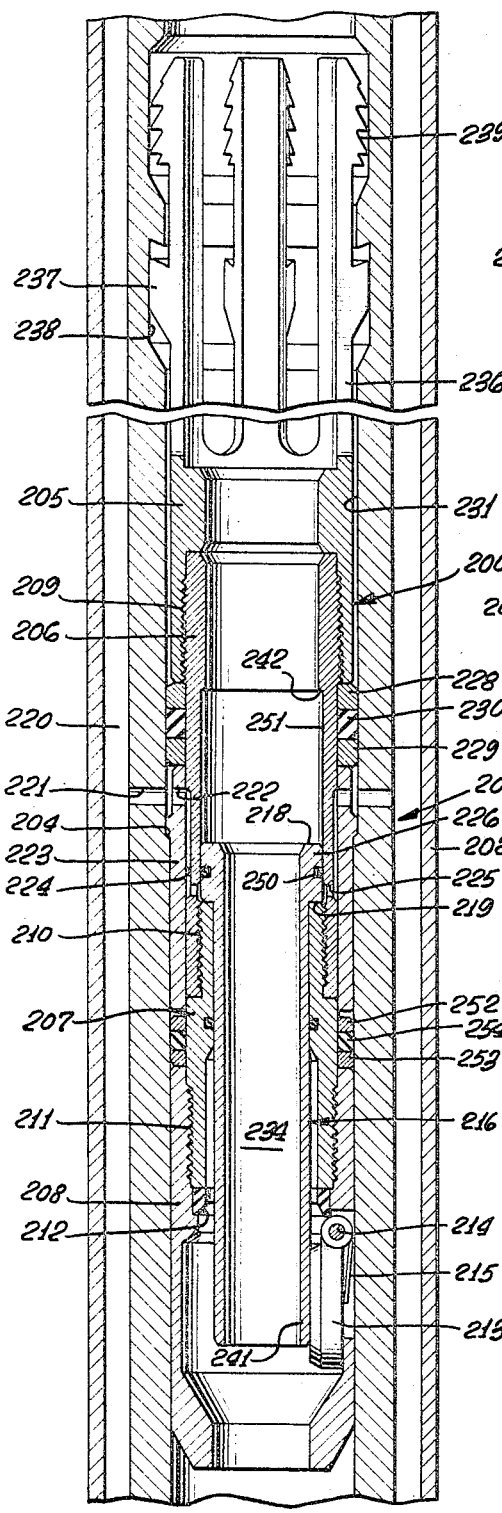
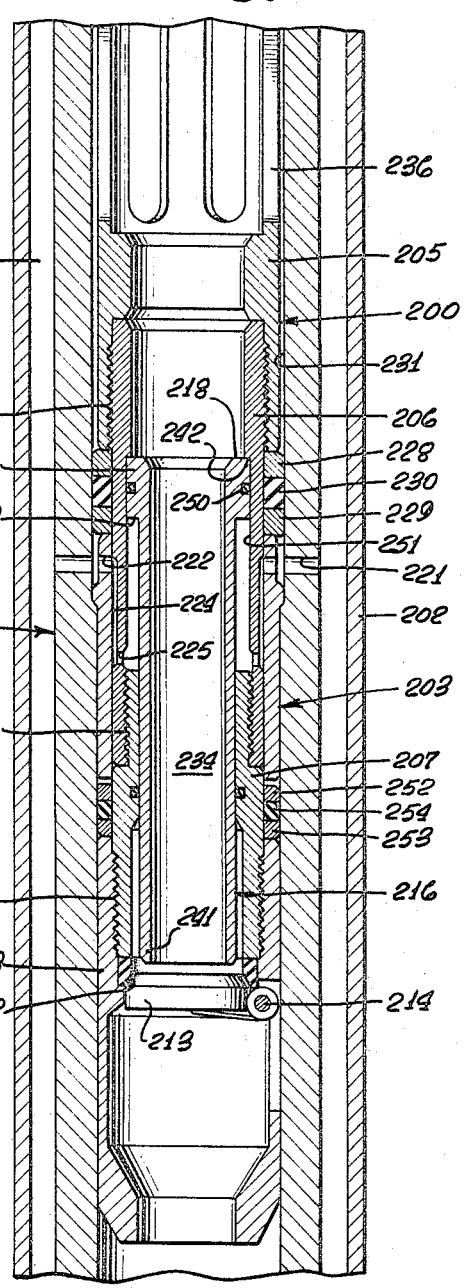
INVENTOR.
JOHN S. PAGE, JR.
BY White & Haefliger
ATTORNEYS.

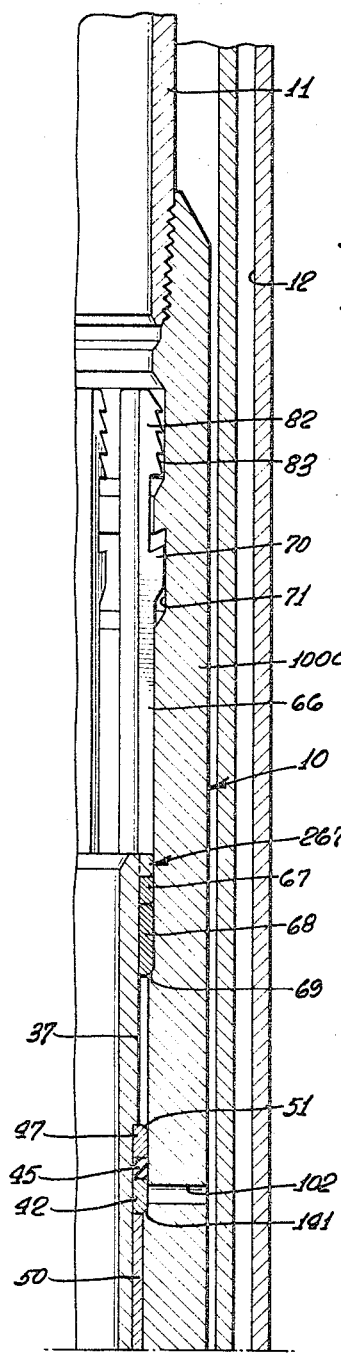
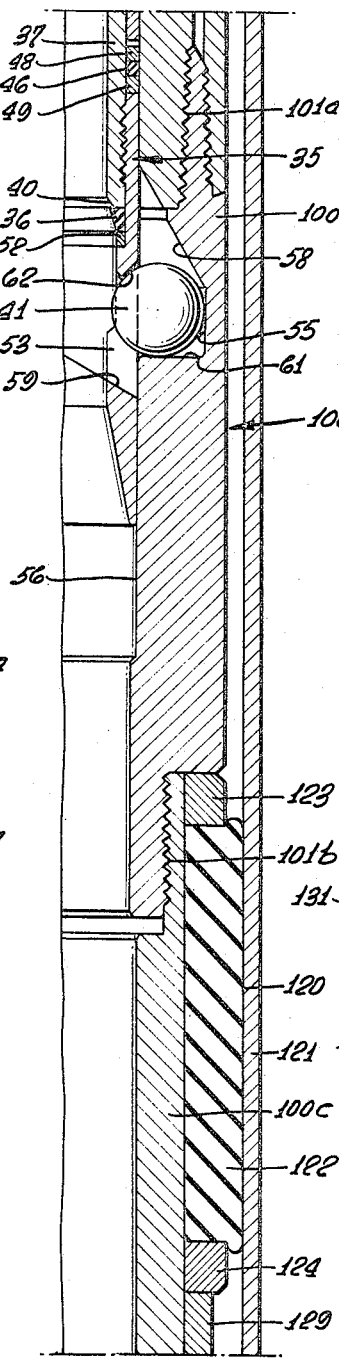
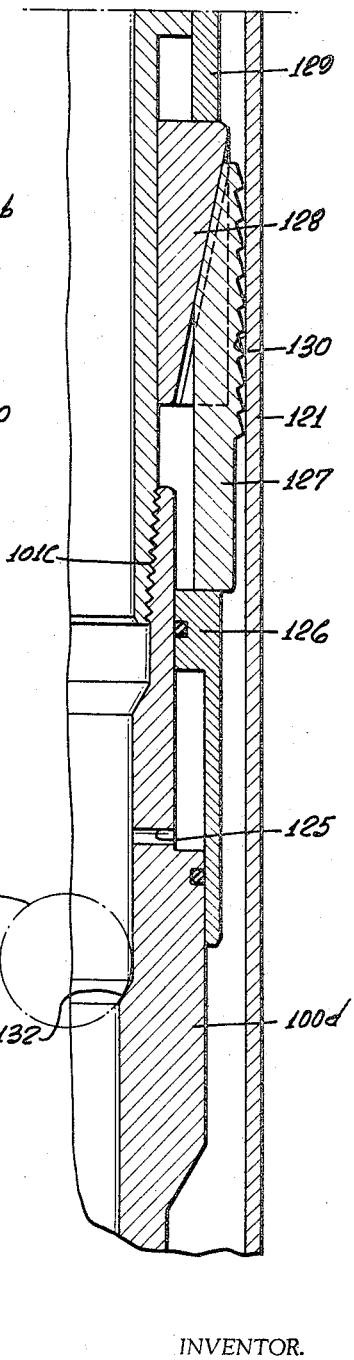

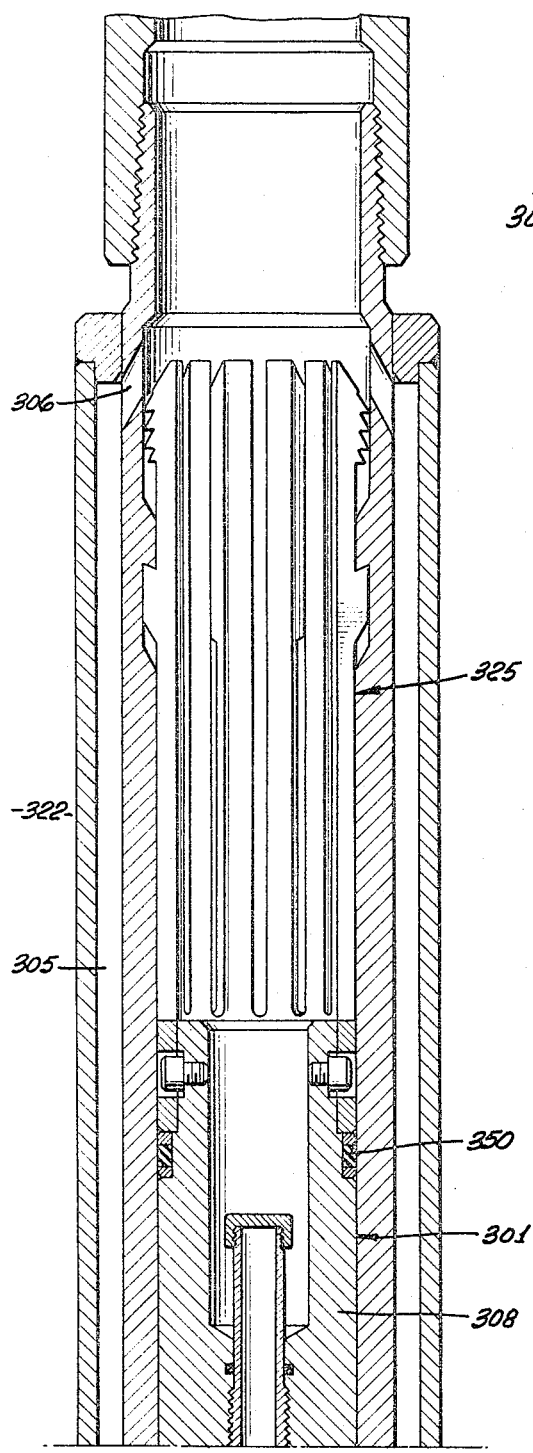

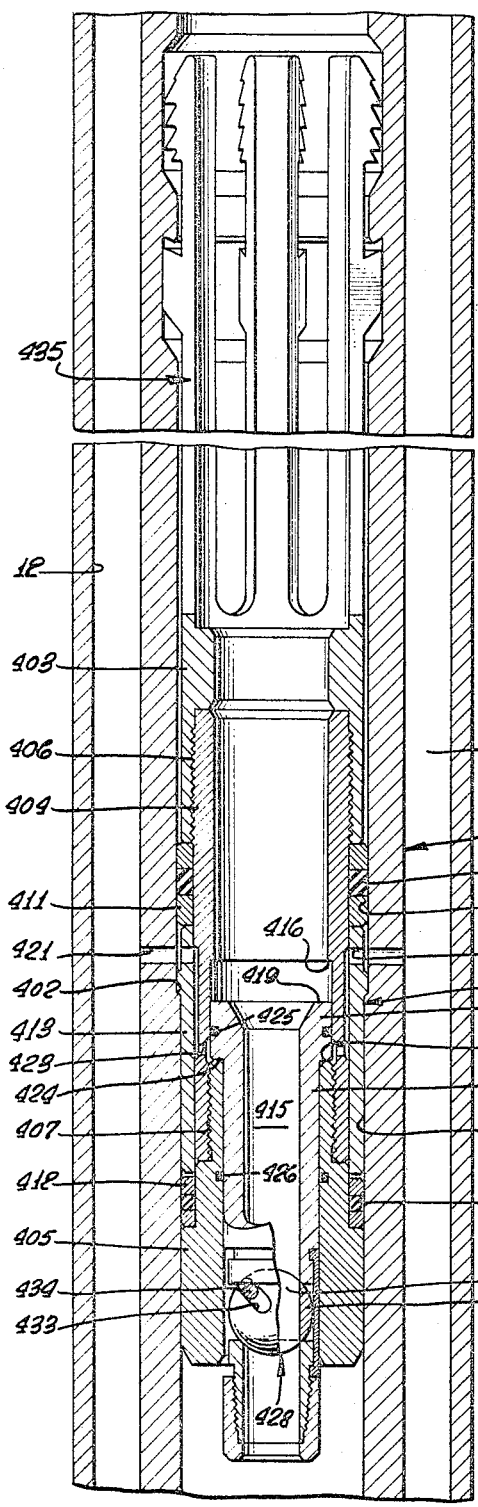
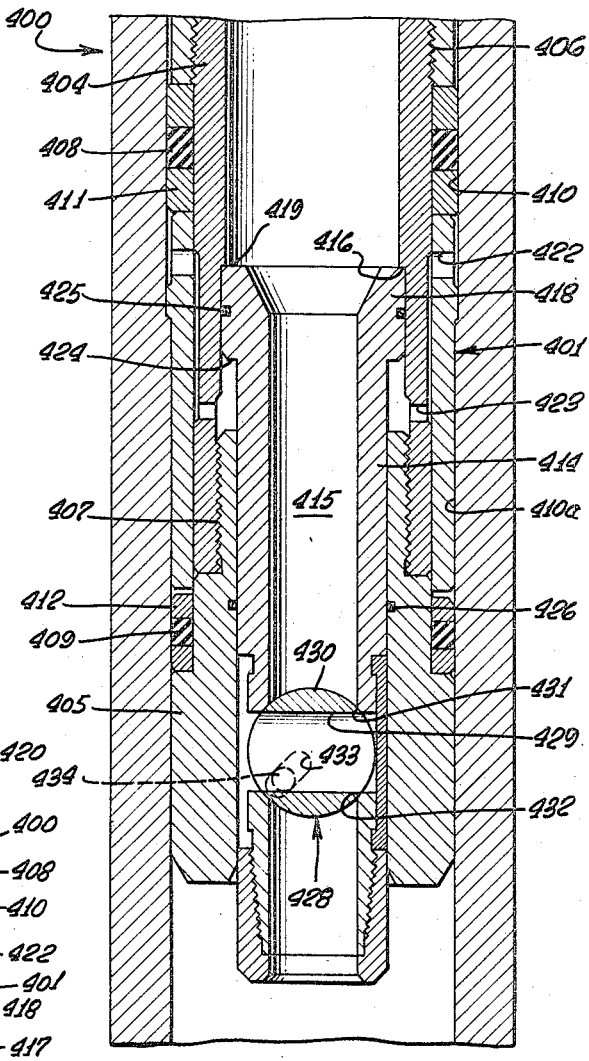

United States Patent Office 3,332,497
Patented July 25, 1967

3,332,497
**TUBING AND ANNULUS PRESSURE RESPONSIVE
AND RETRIEVABLE VALVE**
John S. Page, Jr., 1450 El Mirador,
Long Beach, Calif. 90815
Filed Nov. 12, 1964, Ser. No. 410,512
24 Claims. (Cl. 166—224)

This invention relates generally to the control of well fluid flow, and more particularly concerns apparatus and method for operating a retrievable valve assembly within production tubing to control production fluid flow.

Past efforts to provide control of production flow at sub-surface locations in well tubing have resulted in the provision of valves connected in the tubing string and operated from the surface by transmitting pressure changes through auxiliary control lines. The latter are commonly located outside the tubing and are therefore subject to damaging contact with the well bore during running of the tubing in the well. Another disadvantage with such a system lies in the fact that the valve is commonly connected in the tubing and hence cannot be inspected, repaired or otherwise made accessible without pulling the tubing from the well.

The present invention is founded upon the fundamental insights and objectives that a sub-surface valve may be operated without use of exterior control lines, and may be made subject to operation in response to a decrease in string interior pressure, while being retrievable, and further that the plug in such a valve may be displaced out of the straight path of fluid flow therethrough, allowing other tools to be run in the string through the valve.

In its method aspects, the invention basically contemplates the performance of steps that include running a fluid pressure operable valve and actuator assembly downwardly within a tubing string to an operating location, the assembly being operable to control the upward flow of fluid within the string, and communicating to the assembly at said operating location the pressures of fluid within the string and outside the string for conditioning the assembly to operate in response to a predetermined decline of internal pressure relative to external pressures. Typically, the pressure of fluid within the string constitutes the pressure of upwardly flowing production fluid exerted on the actuator in one direction, while the fluid outside the string constitutes a static column of control fluid in the annulus, the hydrostatic pressure of which is transmitted into the string and to the actuator in a direction opposite to said one direction.

In one method of operation, the valve is run down the tubing and then operated to reduce the upward flow in response to actuator displacement following a predetermined reduction of production fluid pressure relative to control fluid pressure. This method has the primary advantage that the valve will close to shut in the well in the event of sudden reduction of production fluid pressure, as for example might occur in an off-shore installation where the production tubing was severed in the ocean, the hydrostatic head of remaining control fluid acting on the actuator to close the valve against the counteracting force exerted by the hydrostatic head of remaining production fluid acting on the actuator. For re-opening the valve, the tubing pressure acting on the actuator above the valve is simply increased. Further, the valve is retrievable at any time, without pulling the tubing.

Additional features and advantages of the method include the preliminary step of establishing a barrier outside the string and below the valve operating location for retaining the control fluid in a column standing in the annulus outside the string, the provision for running or established the tubing string in a well without need of connecting auxiliary pressure fluid control lines thereto, the provision for retrieving the valve assembly at any time, and the provision for straight vertical communication entirely through the installed valve assembly in open condition thereof, as will be seen.

As to apparatus, the retrievable valve assembly itself basically comprises means sized to be run in the tubing and to be landed at a predetermined location therein, a flow control member carried by said means for movement between increased and reduced flow controlling position, and fluid pressure differential responsive actuator structure carried by said means for movement lengthwise of said string to effect displacement of said member between said positions, said actuator structure having piston surfaces located for exposure to fluid pressure applied from the exterior and interior of the string, said surfaces sized for responding to a decrease in said interior pressure while the exterior pressure remains substantially unchanged to effect displacement of said flow control member to a flow reducing position.

In one form of the retrievable apparatus, the member comprises a ball, and the referred to means forms flow porting and includes a ball seat about the porting and a tubular body having a side opening sized to pass the ball during its movement between seated and unseated positions, whereby the ball may have an unseated position outside a cylinder defined by the bore of the actuator structure, providing an uninterrupted straight line path of communication vertically through the valve assembly. In another form of the retrievable apparatus, the flow control member comprises a spring urged gate pivotally carried to swing toward and away from the seat in response to longitudinal displacement of an actuator sleeve, all in such manner that a straight vertical path of communication may be provided through the valve assembly. In still other forms of the apparatus the flow control member is movable within a tubular body to control upward flow through flow porting communicating sidewardly through the wall of the sub to by-pass the flow upwardly and around the retrievable assembly; and in yet another modification, the flow control member may comprise a rotary ball having a through port that rotates in and out of flow passing communication vertically through the apparatus in response to displacement of the actuator.

The invention has as another object the provision of a novel and unusual combination that includes the retrievable valve assembly together with a tubular sub connectible in a well tubing string to receive the valve assembly, the sub having an inlet port located to communicate hydrostatic pressure from the exterior of the string to a piston surface of the valve actuator structure when the valve assembly is landed in the sub. Where the landed assembly has a ball plug, the sub is typically provided with a bore enlargement to receive the ball in unseated position and outside the bore of the tubular actuator. Also, the latter may have a ramp to guide ball travel through the side opening in the actuator and into the sub enlargement; and the sub may also contain means, as for example a novel pusher and guide, to trap the ball and also to recapture the ball back through the side opening into the tubular actuator in response to upward displacement of the latter relative to the sub. The retrievable valve assembly and sub may also be combined with an outer concentric string to communicate external fluid pressure to the valve independently of pressure in the annulus. Where the valve assembly incorporates a ball plug, the seat may include a tapered metallic annulus to seat the ball, a non-metallic sealing annulus to seal between the ball and tapered metallic seat, and means to anchor the sealing annulus, thereby forming an unusual ball seating and sealing sub-combination. Also, in certain forms of the invention, the sub provides an auxiliary passage to by-pass production fluid flow around the retrievable assembly.

It is a further object of the invention to provide an unusual combination of such a retrievable valve assembly with a novel wire line suspended, flow passing running tool. As will appear, the tool includes a mandrel projecting lengthwise within the assembly and having releasable attachment to the assembly and plug, characterized in that attachment release is effected in response to travel of the running tool relative to the assembly landing thereof in the string. As will appear, the releasable attachment typically includes a magnetic holder located at the mandrel terminal to releasably hold the ball plug in spaced relation to the seat during downward running of the assembly in the string; a retainer to hold valve assembly collet fingers out of jaw engagement with the string; and a downward thrust transmitting member functioning to drive the valve assembly downwardly, while permitting limited overtravel of the tool relative to the valve assembly after shearing of a member connection to the mandrel.

These and other objects and advantages of the invention, as well as the details of an illustrative embodiment, will be more fully understood from the following detailed description of the drawings, in which:

FIG. 1 is a view showing a well tubing string into which the retrievable valve assembly may be run, together with surface controls for operating the valve;

FIGS. 3a and 3b are vertical sections showing the FIG. 2 valve assembly after landing thereof in a sub in the string, the valve ball being unseated and the valve fully open;

FIG. 5 is a horizontal section taken on line 5—5 of FIG. 2a;

FIG. 6 is a horizontal section taken on line 6—6 of FIG. 3a;

FIG. 7 is a horizontal section taken on line 7—7 of FIG. 3b;

FIG. 8 is a vertical section showing another form of valve assembly in a sub connected in a tubing string and embodying the invention, the valve being open;

FIG. 9 is a vertical section showing the FIG. 8 valve in closed condition;

FIGS. 10a, 10b and 10c are vertical half sections showing still another form of the invention; and FIGS. 11 to 13 are vertical sections illustrating further modified forms of the invention.

Figure 2A:
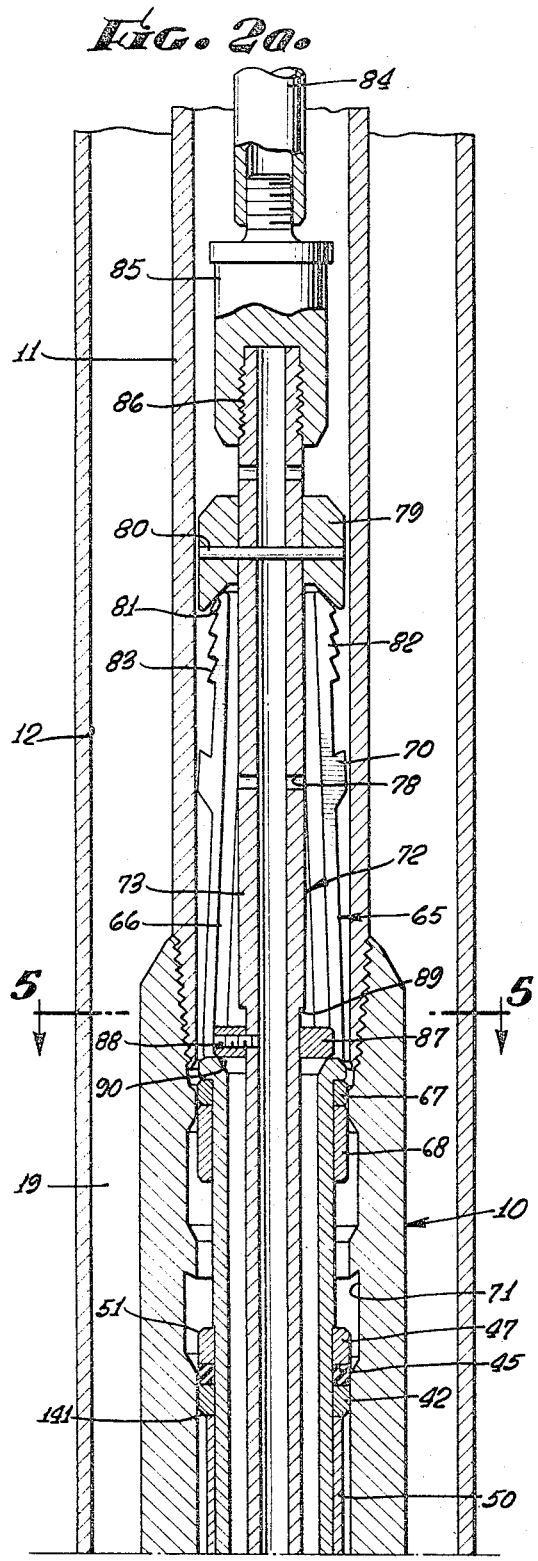
FIGS. 2a and 2b are vertical sections showing one form of the retrievable valve assembly being run into a tubing string.

Referring first to FIG. 1, the sub or landing nipple to receive the valve assembly is shown at 10 as connected in a production tubing string 11 which extends within well casing 12. The latter extends upwardly to the well head where it mounts the control equipment generally designated at 13. Such equipment includes a main valve 14 for controlling the upward flow through the tubing, a production flow control vave 15 in line 16, and an inlet flow control valve 17. Fliud may be pumped at 18 to line 18a and to annulus 19 within the well and outside the tubing above a well packer 28 packing off annulus 19 below a side inlet or opening 31 in the sub 10. For example, the pump may be operated to increase the static pressure within the annulus 19 and at sub 10 of the fluid column in the annulus. In addition, a vent may be provided as at 29, and valve controlled at 30, to drop the pressure of fluid in the annulus 19.

Control equipment 13 also includes a flexible line 20 through which fluid pressure may be pumped at 21 downwardly into the string 11 via the intermediate structure generally designated at 22; the latter includes shut-off valves 23 and 24 at opposite sides of a releasable coupling 25 through which access may be had to the interior of the conduit 26 in order to insert and remove equipment as will be described, such apparatus including the retrievable valve assembly and running tool therefor.

Figure 4A:
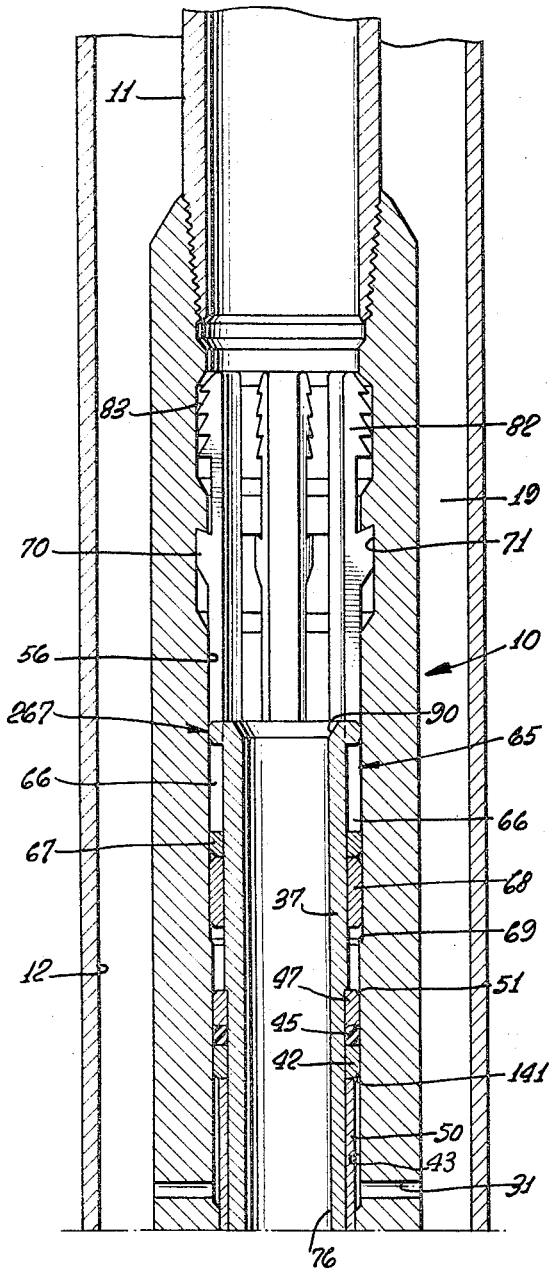
FIGS. 4a and 4b are vertical sections showing the valve assembly after landing thereof in a sub in the string, the valve ball being seated and the valve fully closed.
Figure 4B:
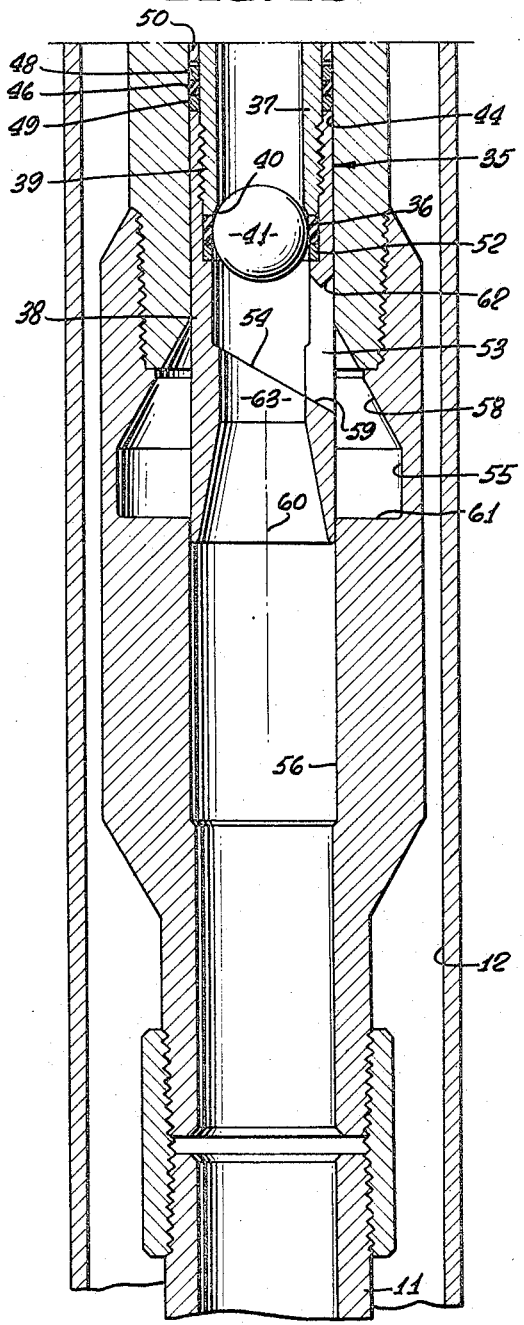

Referring now to FIGS. 4a and 4b, the retrievable valve assembly there illustrated includes what may be generally characterized as flow passing first means 35 sized to be run in the tubing 11 and to be landed at a predetermined location such as within sub 10. The means 35 may include upper and lower tubular body sections 37 and 38 having threaded interconnection at 39, and below the connection a flow port forming metallic annulus 40 is tapered to seat and annularly fit a ball plug 41.

Plug 41 is carried by the tubular body for movement between a seated position, such as seen in FIG. 4b, in which the plug blocks upward flow through the body section 37, and an unseated position such as is viewed in FIG. 3b. In the latter condition, the plug is offset from the seat 40 to unblock the upward flow. The seat structure may also be considered to include a non-metallic annulus 36, as for example rubber or molded tetrafluoroethylene, located to seal the reduced space formed between the seated ball and metal annulus 40 in response to fluid pressure exertion thereagainst at the ball side of the seat. Also, the assembly is shown to include a rigid anchor member 52 of metal and connected as by bonding to the non-metallic seal 36, for retaining the seal in position against extreme fluid pressure tending to displace it.

The first means 35 also carries fluid pressure differential responsive actuator structure carried for movement lengthwise of the string to effect displacement of the plug between its seated and unseated positions. Such actuator structure typically has piston surfaces, above the valve member, and respectively exposable to fluid pressure communicated from the exterior and interior of the string for urging the actuator structure in opposite directions lengthwise of the string. Thus, for example, a piston surface 141 on actuator ring 42 is exposed to fluid pressure communicated from the annulus 19 through a side inlet 31 in the sub 10 to the stepped bores 43 and 44 of the sub between annular seals 45 and 46. Seal 45 is sandwiched between and bonded to rings 42 and 47 to seal on larger bore 43, whereas seal 46 is sandwiched between and bonded to rings 48 and 49 to seal against smaller sub bore 44.

A tubular spacer 50 extends between rings 48 and 42 and is subjected to fluid pressure communicated through side inlet 31. Accordingly, the arrangement is such that exterior fluid pressure exerts a net upward force on actuator piston surface 141 tending to drive the tubular sections 37 and 38 upwardly toward valve seated position. Such upward displacement is opposed by the net pressure of fluid within the string acting downwardly on the actuator, and specifically the surface 51 on ring 47 defined between stepped bores 44 and 43; and tending to drive the sections 37 and 38 bodily downwardly toward valve open or unseated position as seen in FIG. 3b. Accordingly, since the areas of surfaces 51 and 141 are substantially equal, the actuator would be in pressure balanced condition if the interior and exterior fluid pressures exerted theron were equal; however, in actuality the pressure of fluid in the annulus 19 is normally the hydrostatic pressure of a column of liquid such as oil or mud and of a height extending from inlet 19 to the well surface, whereas the pressure at the actuator of fluid flowing in tubing during normal production is normally greater than said exterior hydrostatic pressure, and therefore the valve will be held open. If the production flow is increased at the surface as by opening valve 15, the sub-surface actuator will respond to shut the value, since the hydrostatic pressure at the actuator of the normally mixed oil and gas production flow is less than the hydrostatic pressure of the column of liquid in the annulus. Accordingly, the actuator will be in pressure balance at some reduced flow value, and should the production flow increase above that value, accompanied by a decline in tubing pressure, the valve will shut. It is also possible to test the subsurface valve during normal production, as by pressuring up the liquid in the annulus by operating pump 18.

When the ball plug moves between the seated position of FIG. 4b to the unseated position of FIG. 3b, it passes through a side opening 53 in the body section 38. Typically, the section 38 carries a downwardly and laterally inclined ramp 54 to guide the ball as it gravitates away from the downwardly facing seat structure and through the side opening 53. When the ball is in the fully unseated position seen in FIG. 3b, it is received in an annular bore enlargement or side pocket 55 formed within the bore 56 of the sub 10, the ball position then being characterized in that it is substantially completely outside a flow stream cylinder defined by the reduced bore 57 of the body section 38. Accordingly, a fully open vertical pasage is provided through the valve assembly, including bore 63, to pass wire line equipment as well as the well fluid.

Another feature of the invention has to do with the provision of second means carried in the sub to trap the ball plug partly in the enlargement and partly in opening 53, and to urge the ball back through that side opening in response to upward displacement of the tubular body sections 37 and 38 relative to the sub. Thus, for example, such second means may take the unusually advantageous form of a guide surface 58 at the upper side of the enlargement and a pusher lip 59 at the outer terminal of ramp 54 for urging the ball toward guide surface 58 in response to upward displacement of body section 38. Guide surface 58 is upwardly tapered with lesser angularity with respect to the body axis 60 than the ramp, in order that the ramp and guide may coact to urge or pinch the rising ball back through the side opening 53. Guide surface 58 may typically have about 30 degree angularity with respect to axis 60, whereas ramp 54 may have about 60 degree angularity with respect to that axis.

In FIG. 3b the ball 41 has moved laterally into enlargement 55 and is then trapped in position between ledge 61 and lip 62 of body 38. When the body section 38 thereafter rises for closing the valve, the lip 59 pushes the ball to engage the guide surface 58. The bore diameter of body 38 at 63 is less than the diameter of ball 41 to prevent the ball from dropping out of the body 38.

Referring now to FIGS. 4a and 4b, the retrievable valve assembly includes a collect 65 having a series of circularly spaced flexible fingers 66 carried by a collet ring 67. The latter is carried about body section 37, which is shiftable vertically relative thereto as is clear from a comparison of FIGS. 3 and 4. Collet fingers 66 project upwardly through slots 266 in the flanged head 267 of body section 37. In this regard, a spacer ring 68 is also provided on section 37 directly below collet ring 67 for engagement with the sub at landing location 69. Fingers 66 have outwardly projecting jaws 70 urged outwardly by the spring fingers for reception in an annular recess 71 sunk in the sub bore 56, whereby the collet anchors the valve assembly to the sub following its landing therein.

Figure 2B:
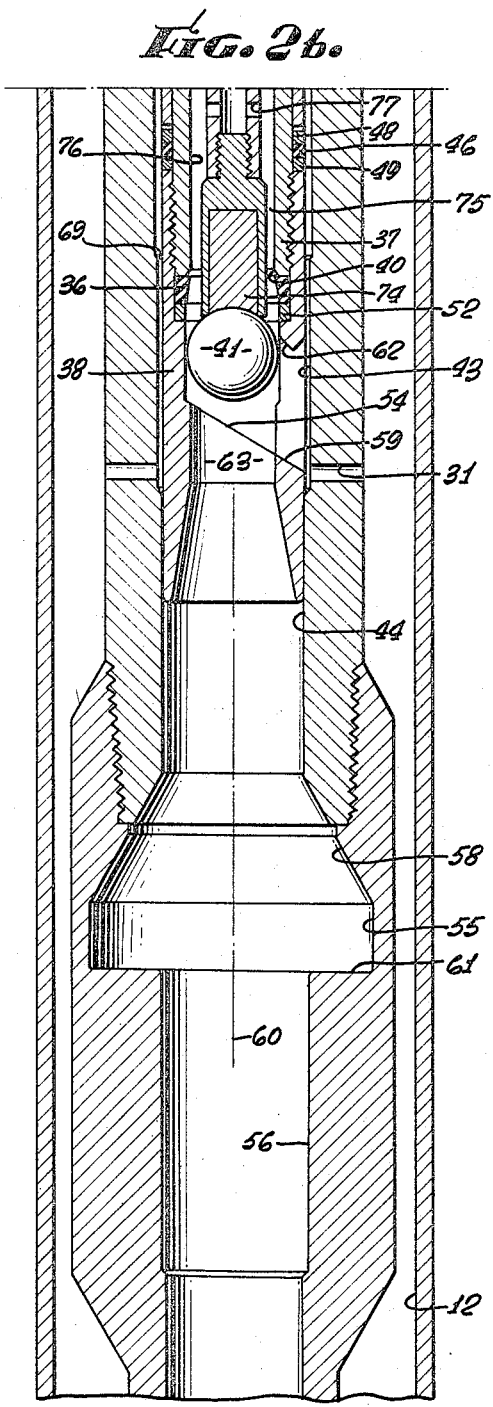

FIGS. 2a and 2b illustrate a special tool 72 for running the valve assembly downwardly in well tubing to effect such landing. The tool includes a tubular mandrel 73 projecting lengthwise vertically and downwardly within the body section 37 and having releasable attachment to the valve assembly characterized in that attachment release is effected in response to travel of the running tool relative to the valve assembly after the latter is landed in the string, i.e. the sub. Such attachment typically includes a magnetic holder 74 located at the mandrel lower terminal to releasably hold the ball plug 41 spaced downwardly off seat 40 during downward running of the valve assembly in the string. As a result, the assembly then can pass the well fluid through which it is run, the fluid flowing relatively upwardly between the ball and seat then upwardly within the clearance 75 between the mandrel and bore 76 of body section 37, then into the tubular mandrel via side porting 77, then upwardly within the mandrel to exit via side ports 78.

The releasable attachment of the running tool to the valve assembly also typically includes a retainer carried by the mandrel at a location to releasably retain the collet fingers 66 and jaws inwardly relative to the string bore during running of the valve assembly in the string. One such retainer is seen at 79 pinned at 80 to the mandrel, and having a downwardly flaring face 81 to cam the collet finger terminals 82 inwardly, as indicated in FIG. 2a. Terminals 82 are typically serrated as at 83 for latching engagement by a retrieving tool, not shown, and which urges the fingers 66 inwardly to release the jaws 70 from sub recess 71, following which the valve assembly may be pulled upwardly within the string for retrieval. Tool 72 is typically suspended during running in the string by means of a wire line 84 attached to coupling 85, which is in turn attached to the tool threaded nipple 86.

Finally, the releasable attachment of the running tool 72 to the valve assembly 35 includes a downward thrust transmitting member engageable with the tubular body upper section 37 to limit downward travel of the tool relative to the valve assembly when the ball plug is spaced from the seat, but located within the bore of body section 39. One such member is seen at 87 in FIG. 2a as having shearable pin connection at 88 to the mandrel. At the same time, the member 87 remains in blocking relation to the mandrel to limit downward overtravel of the mandrel relative to the valve assembly after shearing of the pin connection 88. Such blocking relation to the mandrel may for example be established by the mounting of member 87 to slide on the mandrel after shearing of the pin, and to engage the mandrel shoulder 89 as the mandrel descends relative to the upper section 37 of the valve body. Member 87 of course transmits downward thrust to the valve body, as for example by engagement therewith at 90.

Basically, the method of operation to control vertical flow of fluid in an installed well tubing string includes running the valve and actuator assembly 10 downwardly within the installed string to an operating location, and communicating to the assembly at that location the pressures of fluid within the string and outside the string for conditioning the assembly to operate in response to a predetermined decline of string internal pressure relative to the other. As an example, the assembly is conditioned by the pressures of production fluid inside the string and a hydrostatic column of control fluid outside the string to operate reducing the upward flow in response to a predetermined reduction of production fluid pressure relative to control fluid pressure. In the described example, the actuator moves upwardly to release the ball and displace it upwardly to close the valve, the flow pressure holding the ball seated. Thereafter, the valve may be re-opened by pressuring down the tubing to overcome the upward forces applied to the ball and actuator, the latter then moving downwardly with the ball, which moves out of the flow stream to become trapped in the side pocket. The assembly may be retrieved when desired, without requiring pulling of the tubing. Preliminary to installing the valve assembly, the packer 28 may be set below side inlet 31 in the landing nipple or sub, and the hydrostatic column established above the packer and in the annulus. The valve operability may be tested at any time by increasing the pressure in the annulus and observing a drop in production flow accompanying closing of the sub-surface valve.

Referring now to FIGS. 10a, 10b and 10c, the retrievable valve assembly there illustrated is generally the same as that described in connection with FIGS. 2, 3 and 4, and therefore its similar parts bear the same identifying numbers. One the other hand, the modified sub 100 includes tubular body sections 100a, 100b, 100c and 100d having thread interconnection at 101a, 101b, and 101c. Upper sub section 100a has a side inlet 102 corresponding to side inlet 31 in FIG. 2.

The string seen in FIGS. 10a, 10b and 10c may be completely packed off at 120 against the casing 121 in response to pressure energization of a packer 122. The latter is carried between upper and lower pressure rings 123 and 124 mounted as section 100c of the sub, and lower ring 124 is moved upwardly to energize the packer in response to sufficient tubing pressure communication through a side port 125 in the sub to the underside of piston 126. As the latter elevates, it displaces slips 127 upwardly against a downwardly tapering cone 128 slidably mounted on the sub section 100c. Accordingly, force is transmitted from the slips to the cone and then to a spacer 129 which engages the underside of ring 124. Also, the slips move outwardly to engage the bore 130 of the casing 121 to anchor the valve sub in position therein. Increased fluid pressure may be developed within the string for communication to piston 126 by dropping a ball 131 in the string to land at 132 in the sub section 100d, and then transmitting increased pressure downwardly in the string as indicated at 21 in FIG. 1.

Referring now to the modified valve assembly 200 seen in FIGS. 8 and 9, it is shown as run downwardly into the sub 201 connected in a tubing string which has been previously run into a well shown to include casing 202. In this regard, the surface equipment may be the same as seen in FIG. 1.

The retrievable valve assembly includes flow passing first means 203 sized to be run into the tubing sub, and landed at internal shoulder 204 therein. The first means 203 typically includes body sections 205, 206, 207 and 208, and which have threaded interconnection at 209, 210 and 211. Flow port forming annular seat is provided at 212 on the first means 203 for receiving a plug in the form of a gate 213. The latter is pivoted at 214 to swing toward and away from the seat 212, and a spring 215 yieldably urges the plug gate to close toward the seat, as seen in FIG. 9, blocking upward flow through the string.

Fluid pressure differential responsive actuator structure incorporated in the first means 203 comprises a sleeve 216 movable to effect displacement of the gate between the fully enclosed position of FIG. 9 and the fully open position of FIG. 8, the gate then being completely outside a cylinder defined by the bore 234 of the sleeve 216.

The actuator sleeve has an upwardly facing piston surface 218 exposed to fluid pressure in the string for urging the actuator in a downward direction to open the valve gate. The sleeve also has a downwardly facing piston surface 219 exposed to fluid pressure in the annulus 220 via side ports 221 in the sub, side port 222 in a tubular landing spacer 223, clearance 224 between spacer 223 and section 206, and side port 225 in the latter. In this regard, the effective areas of surfaces 218 and 219 are substantially equal. Piston head 226 of sleeve 216, which carries surfaces 218 and 219, also carries an annular seal 250 slidably engaging enlarged bore 251 of sub section 206. In addition, a sandwich seal including metallic rings 228 and 229 bonded to a non-metallic seal ring 230 seals off between the sub section 206 and bore 231 of the sub above side ports 221 and 222; and seal rings 252 and 253 as well as non-metallic seal 254 therebetween and bonded thereto seal off between sub section 207 and bore 231, below said side ports.

The valve assembly 200 also includes flexible collet fingers 236 carrying jaws 237 urged outwardly into a recess 238 cut in the bore 231 of the sub, the jaws thereby latching to the sub when the assembly is landed at shoulder 204. The upper terminals of the fingers 236 are serrated at 239 for trapping a retrieving tool acting to urge the fingers 236 inwardly and to unlatch the jaws 237 from the sub.

In operation, the valve assembly may be lowered in the string with the actuator sleeve 216 in down position as seen in FIG. 8 to pass the well fluid in the string through the valve assembly. At this time, the lower portion 241 of the sleeve is not urged upwardly by the spring urged gate, since the latter is deflected so that it only exerts a side load on the sleeve. After the assembly has been landed, the well may then be produced with the valve open. When internal pressure declines sufficiently, the external hydrostatic pressure dominates the actuator sleeve, urging it upwardly, to stop at shoulder 242 as seen in FIG. 9. The gate 213 is then urged to closed position by spring 215. Subsequently, when the valve is to be opened, the internal pressure is increased sufficiently that it dominates the actuator sleeve, forcing it downwardly to displace the gate to open position.

It will be noted that in each embodiment of the invention described thus far, the valve member when closed upwardly against the seat transmits the well pressure exerted upwardly thereagainst to the so-called first means. This upward pressure must be overcome when the valve is to be opened, and when the plug comprises a ball as seen in FIGS. 1–7 and 10, the fluid pressure within the string and above the plug may be increased to equalize the fluid pressure below the plug. Thereafter, the actuator structure may be operated to displace the plug to open position.

Referring now to FIG. 11, the modified sub or landing nipple 300 receives the valve assembly 301 at landing shoulder 302. The sub forms flow porting 303 communicating sidewardly through the wall of the tubular sub body between the sub bore 304 and an auxiliary annular passage 305, the latter providing a by-pass for fluid to flow upwardly through the porting 303 and around the assembly 301. In this regard, passage 305 also communicates at 306 with the sub bore above the assembly 301.

Assembly 301 provides first means including body sections 308 and 309 having thread connection at 310, lower section 309 being tubular and having a side port 311 registering with porting 303. The actuator structure incorporated in the first means comprises a sleeve 312 movable axially within and relative to the body sections in flow controlling relation to the port 311. Thus, when the sleeve is up as illustrated, production fluid may flow out through ports 311 and 303, whereas when the sleeve is down, such flow is blocked. In this regard, side seals 313 and 314 in the body sections engage the sub bore in straddling relation to port 303 to block leakage in sleeve up position, seals 314 and 350 straddling port 303 in sleeve down position.

Sleeve 312 is mounted to slide axially on a central mandrel 314a between limits 315 and 316, and in response to fluid pressure application to its piston surfaces. Thus, when the sleeve is in up or open position as illustrated, upward pressure of production fluid is applicable to the sleeve lower end surface 317, surface 317a and sleeve interior surface 318 via the clearance 319, port 319a, clearance 320, port 320a, and chamber 321. Downward pressure from the outer annulus 322 is applicable to sleeve upper end surface 323 via side inlet 324 in outer wall 325 and sub wall 326, and side inlet 327 in body section 308, so that the areas receiving upward and downward pressure are equal. In this form of the invention, the valve, or sleeve, is urged toward open position by production fluid pressure, and is urged toward closed position by the external hydrostatic pressure in the outer annulus 322. The sleeve carries outer side seals at 330 and 331 to engage the bore 332 of body sections 308 and 309, preventing leakage. Side seals 333 and 334 engage the mandrel 314a and sleeve to straddle chamber 321. The valve sleeve closes when production fluid pressure declines sufficiently, while the external hydrostatic pressure remains unchanged. When the sleeve is in closed or down position, the surface 318 is subjected to fluid pressure exerted within the tubing and above the valve, as via passage 305, port 303, clearance 319, port 319a, clearance 320, port 320a and chamber 321, and this pressure can be increased by surface application as indicated at 21 in FIG. 1, to effect opening of the valve.

Assembly 301 carries collet structure generally designated at 335 and similar to that previously described in FIG. 8.

Referring to FIG. 12, a landing nipple or sub 400 receives the valve assembly 401 at shoulder 402. Assembly 401 provides flow passing means including tubular body sections 403, 404 and 405, thread connection at 406 and 407, and carrying annular side seals 408 and 409 to engage and seal at the sub bore 410 and 410a. Also carried on the body sections and between the seal rings 411 and 412 is a landing sleeve 413 flanged to engage sub shoulder 402 and to transmit loading to body section 403 via seal ring 411 and seal 408.

The actuator structure incorporated in the first means comprises a sleeve 414 forming vertical through porting at 415 and movable lengthwise of and within the body sections 404 and 405, between upper limit 416 and lower limit 417 which engage the sleeve head 418.

Interior pressure of production fluid is applicable on piston surface 419 to urge the sleeve downward, whereas exterior pressure of fluid in the annulus 420 is applicable through side inlets 421 in the sub, 422 in the sleeve 413 and 423 in body section 404, and upon piston surface 424 to urge the sleeve upward. Annular seals 425 and 426 seal off between the actuator sleeve 414 and the body sections 404 and 405 in straddling relation to said inlets to prevent leakage of exterior or annulus fluid pressure.

The valve member comprises a rotary ball 428 having a through port 429, and having connection to the actuator sleeve 414 and body section 405 to rotate the ball between open and closed positions in response to sleeve lengthwise movement within the body sections. Thus, in the actuator sleeve down position illustrated, the ball port registers with the sleeve porting 415 to provide a straight through open flow condition, whereas in the actuator sleeve up position, as seen in FIG. 13, the ball port is turned 90 degrees so that the ball side 430 obstructs and shuts off production flow through the actuator sleeve port 415. Ball 428 turns against seats 431 and 432, and has a slot 433 receiving a dog 434 connected to body section 405 in such manner as to rotate the ball as it travels vertically relative to section 405. In operation, as internal pressure declines, the actuator sleeve is urged upwardly to valve closed position, the hydrostatic pressure of the external column of fluid in the annulus remaining unchanged. Collet structure 435 is similar to that described in FIG. 8.

I claim:

1. In combination with a well tubing string, a retrievable assembly operable to control the upward flow of well fluid in said string, comprising means including a tubular body sized to be run vertically in the tubing and to be landed at a predetermined location therein, said means forming flow porting and an annular seat extending about said porting, a ball plug carried by said means for movement relative to said seat to control said upward flow, said body having a side opening sized to pass the ball plug during said movement and the body being movable vertically relative to the string during said ball plug movement, and said means including actuator piston surfaces carried to receive fluid pressure application for effecting said body movement, the tubing string having porting to communicate fluid pressure applied from the string exterior to an actuator piston surface facing in one vertical direction, another piston surface facing in the opposite vertical direction being out of communication with said string porting but in communication with the string interior to receive application of string interior fluid pressure, said surfaces sized for responding to a decrease in said interior fluid pressure application relative to the exterior fluid fluid pressure application to effect movement of the ball plug relatively toward said seat.

2. The assembly of claim 1 in which said means extends vertically, the seat faces downwardly, and said means has a downwardly and laterally inclined ramp to guide the ball downwardly and laterally away from said seat and through said side opening.

3. The assembly of claim 1 in which said actuator structure and seat are sufficiently integral as to be simultaneously movable lengthwise of the string.

4. The assembly of claim 1 in which said body has a bore to pass said flow, the ball plug having an unseated position substantially completely outside a cylinder defined by said bore.

5. The assembly of claim 1 in which said means includes flexible collet fingers having jaws urged outwardly for attaching to the tubing.

6. The assembly of claim 5, including a tool to run the assembly in well tubing, said tool including a mandrel projecting lengthwise within said means and having releasable attachment to said assembly and characterized in that attachment release is effected in response to travel of the running tool relative to said assembly after assembly landing in said string, the tool having porting to pass string fluid upwardly therethrough.

7. The combination of claim 6 in which said attachment includes a magnetic holder located at the mandrel terminal to releasably hold the ball plug spaced off said seat during downward running of said assembly in the string.

8. The combination of claim 6 in which said attachment includes a collet finger retainer carried by the mandrel at a location to releasably retain the collet fingers and jaws inwardly relative to the string bore during running of said assembly in the string.

9. The combination of claim 6 in which said attachment includes a downward thrust transmitting member engageable with said first means to limit downward travel of the tool relative to said assembly when the ball plug is spaced from said seat but located within said tubular body, said member having shearable connection to the mandrel while remaining in blocking relation thereto to limit downward overtravel of the mandrel relative to said assembly after shearing of said connection.

10. In combination with a tubular sub connectable in a well tubing string, the sub having a bore, a retrievable assembly operable to control the upward flow of well fluid in said string, comprising means including a tubular body sized to be run vertically in the tubing and to be landed in the sub bore, said means forming flow porting and an annular seat extending about said porting, a ball plug carried by said means for movement relative to said seat to control said upward flow, said body having a side opening sized to pass the ball plug during said movement and the body being movable vertically relative to the string during said ball plug movement, said means including actuator piston surfaces carried to receive fluid pressure application for effecting said body movement, the sub having side inlet porting to communicate fluid pressure applied from the sub exterior to one actuator piston surface facing in one vertical direction, another piston surface facing in the opposite vertical direction being out of communication with said sub side porting but in communication with the sub interior to receive application of sub interior fluid pressure, said surfaces sized for responding to a decrease in said interior fluid pressure application relative to the exterior fluid pressure application to effect movement of the ball plug relatively toward said seat, and the sub forming a bore enlargement sized to receive the ball in an unseated position thereof characterized in that the ball is then substantially completely outside a cylinder defined by the body bore.

11. The combination of claim 10 in which said actuator structure and said seat are sufficiently integral as to be simultaneously movable lengthwise of and within the sub.

12. The combination of claim 10 including tubular means outside said sub and attached to said string to communicate said exterior fluid pressure through said side inlet in the sub to said one piston surface.

13. The combination of claim 10 including flexible collet fingers carried by said first means and having jaws urged outwardly for attaching to the string, said sub having a bore recess to receive said jaws.

14. The combination of claim 10 in which said sub has stepped bores, said first means has annular sealing engagement with said stepped bores at spaced locations, and said side inlet is located to communicate exterior fluid pressure to said one piston surface at the stepped bore locus between said spaced locations of annular sealing engagement.

15. The combination of claim 10 including a tubing string into which said sub is connected, and a packer carried by one of said string and sub and below said side inlet for sealing off between the string and the well bore.

16. The combination of claim 10 in which said seat includes a metallic annulus tapered to seat the ball, and the assembly includes a non-metallic annulus located to seal the reduced spaced formed between the seated ball and metal annulus in response to fluid pressure exertion thereagainst at the ball side of the seat, and a rigid anchor member connected to said non-metallic annulus.

17. The combination of claim 10 in which said first means and sub extend vertically, the seat faces downwardly, and said first means has a downwardly and laterally inclined ramp proximate said enlargement to guide the ball downwardly and laterally away from the seat and through said side opening toward the interior of said enlargement.

18. The combination of claim 17 including second means contained in the sub to trap the ball partly in said enlargement and partly in said side opening, and to urge the ball back through said side opening into said tubular body in response to upward displacement of said tubular body relative to the sub.

19. The combination of claim 18 in which said second means includes a guide at the upper side of said enlargement, and a pusher carried by said tubular body for urging the ball toward said guide in response to said tubular body upward displacement.

20. The combination of claim 10 including a tool to run the assembly in well tubing, said tool including a mandrel projecting lengthwise within said means and having releasable attachment to said assembly and characterized in that attachment release is effected in response to travel of the running tool relative to said assembly after assembly landing in said string, the tool having porting to pass string fluid upwardly therethrough.

21. The combination of claim 20 in which said attachment includes a magnetic holder located at the mandrel terminal to releasably hold the ball plug spaced off said seat during downward running of said assembly in the string.

22. The combination of claim 20 in which said attachment includes a collet finger retainer carried by the mandrel at a location to releasably retain the collet fingers and jaws inwardly relative to the string bore during running of said assembly in the string.

23. The combination of claim 20 in which said attachment includes a downward thrust transmitting member engageable with said first means to limit downward travel of the tool relative to said assembly when the ball plug is spaced from said seat but located within said tubular body, said member having shearable connection to the mandrel while remaining in blocking relation thereto to limit downward overtravel of the mandrel relative to said assembly after shearing of said connection.

24. In combination with a tubular sub connectible in a well tubing string, the sub having a bore, an assembly operable to control the upward flow of well fluid in said string comprising,
  means including a tubular body forming flow porting and an annular seat extending about said porting,
  a ball plug carried by said means for movement relative to said seat to control said upward flow,
  said body having a side opening sized to pass the ball plug during said movement and the body being movable vertically relative to the string during said ball plug movement,
  said means including actuator piston surfaces carried to receive fluid pressure application for effecting said body movement, the sub having side inlet porting to communicate fluid pressure applied from the sub exterior to one actuator piston surface facing in one vertical direction, another piston surface facing in the opposite vertical direction being out of communication with said sub side porting but in communication with the sub interior to receive application of sub interior fluid pressure, said surfaces sized for responding to a decrease in said interior fluid pressure application relative to the exterior fluid pressure application to effect movement of the ball plug relatively toward said seat,
  and the sub forming a bore enlargement sized to receive the ball in an unseated position thereof.

References Cited

UNITED STATES PATENTS

| | | | |
|---|---|---|---|
| 2,921,601 | 1/1960 | Fisher | 137—496 |
| 3,065,794 | 11/1962 | Page | 166—224 |
| 3,071,151 | 1/1963 | Sizer | 166—224 |
| 3,078,923 | 2/1963 | Tausch | 166—224 |
| 3,090,443 | 4/1963 | Bostock | 166—224 |
| 3,200,837 | 8/1965 | Brown | 166—224 |

CHARLES E. O'CONNELL, *Primary Examiner.*

JAMES A. LEPPINK, *Examiner.*